United States Patent
Julian (10) Patent No.: US 9,154,339 B2
(45) Date of Patent: Oct. 6, 2015

(54) METHODS AND APPARATUS FOR DECODER SELECTION IN COMMUNICATION SYSTEMS

(75) Inventor: David Jonathan Julian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 2156 days.

(21) Appl. No.: 11/020,342

(22) Filed: Dec. 22, 2004

(65) Prior Publication Data

US 2006/0133542 A1    Jun. 22, 2006

(51) Int. Cl.
H04L 27/06 (2006.01)
H04L 25/03 (2006.01)
H04L 25/02 (2006.01)
H04L 1/00 (2006.01)

(52) U.S. Cl.
CPC ............ *H04L 25/03* (2013.01); *H04L 25/0222* (2013.01); *H04L 1/0045* (2013.01); *H04L 25/0228* (2013.01); *H04L 25/03184* (2013.01); *H04L 25/03318* (2013.01)

(58) Field of Classification Search
CPC ............ H04L 25/03; H04L 25/0222; H04L 25/03184; H04L 25/0228; H04L 1/0045; H04L 25/03318
USPC ......... 375/340, 260, 330, 329, 220, 130, 267; 455/69, 101, 445
See application file for complete search history.

(56) References Cited

U.S. PATENT DOCUMENTS

| | | | | |
|---|---|---|---|---|
| 5,852,630 A * | 12/1998 | Langberg et al. | ............ | 375/219 |
| 5,982,766 A | 11/1999 | Nystrom et al. | | |
| 6,151,484 A | 11/2000 | Ramesh | | |
| 6,195,327 B1 | 2/2001 | Lysejko et al. | | |
| 6,490,460 B1 * | 12/2002 | Soliman | ......... | 455/522 |
| 7,116,957 B2 | 10/2006 | Sih et al. | | |
| 7,224,726 B2 * | 5/2007 | Perlow et al. | ......... | 375/233 |
| 7,319,719 B1 * | 1/2008 | Farlow | ......... | 375/229 |
| 7,386,277 B2 * | 6/2008 | Cho et al. | ......... | 455/69 |
| 2002/0097785 A1 * | 7/2002 | Ling et al. | ......... | 375/147 |
| 2005/0286657 A1 * | 12/2005 | Thyssen et al. | ......... | 375/340 |

FOREIGN PATENT DOCUMENTS

| | | |
|---|---|---|
| EP | 1096698 | 5/2001 |
| GB | 2276064 | 9/1991 |
| JP | 2001127692 | 5/2001 |

(Continued)

OTHER PUBLICATIONS

International Search Report—PCT/USO5/046740—International Search Authority, European Patent Office, Sep. 25, 2006.

(Continued)

*Primary Examiner* — Dhaval Patel
(74) *Attorney, Agent, or Firm* — Donald C. Kordich (57) ABSTRACT

Techniques for efficiently choosing a desired decoder in the presence of varying Doppler and/or mobility are disclosed. In one aspect, a method for selecting a filter for decoding forward-link (FL) information in a wireless communication network comprises the acts of decoding reverse-link (RL) information by a plurality of decoders, each being optimized based on a different parameter, and comparing a plurality of outputs from the decoders, based on a metric, to determine a desired decoder or parameter for reporting to an access terminal.

45 Claims, 5 Drawing Sheets

(56) References Cited

FOREIGN PATENT DOCUMENTS

| JP | 2004007793 | 1/2004 |
|---|---|---|
| RU | 2231227 | 6/2004 |
| RU | 2239950 | 11/2004 |
| WO | WO9501032 | 1/1995 |
| WO | 9711535 | 3/1997 |
| WO | WO0016513 | 3/2000 |
| WO | 2004019622 | 3/2004 |
| WO | WO2004023672 | 3/2004 |

OTHER PUBLICATIONS

International Preliminary Report on Patentability—PCT/US2005/046740, International Search Authority—The International Bureau of WIPO—Jun. 26, 2007.

Written Opinion—PCT/US2005/046740, International Search Authority—European Patent Office—Jun. 22, 2007.

European Search Report—EP05855323—European Patent Office, Munich, Jun. 2, 2008.

Li, H. et al.: "An Adaptive Filtering Technique for Pilot Aided Transmission Systems" Vehicular Technology Conference, 1990 IEEE 40th, May 6, 1990, pp. 507-512.

Ran, J. et al.: "Decision-directed Channel Estimation Method for OFDM Systems with High Velocities" VTC 2003-Spring. The 57th IEEE Semiannual Vehicular Technology Conference. Proceedings. Apr. 22-25, 2003, IEEE Vehicular Technology Conference.

Rey, F. et al.: "A Robust Transmitter Design Based on Cutoff Rate for MIMO Multicarrier Systems with Imperfect Channel Estimates" Sensor Array and Multichannel Signal Processing Workshop Proceedings, 2004 Barcelona, Spain Jul. 18-21, 2004.

* cited by examiner

METHODS AND APPARATUS FOR DECODER SELECTION IN COMMUNICATION SYSTEMS

BACKGROUND

I. Field

The present invention relates generally to communication and more specifically to techniques for decoder selection in a communication system.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

A communication system may employ decoders for estimating transmitted information. There is therefore a need in the art for techniques for selection of filters or decoders that perform reliably in the presence of varying Doppler and/or mobility.

SUMMARY

Techniques for efficiently choosing a decoder in the presence of varying Doppler and/or mobility are disclosed. In one aspect, a method for selecting a filter for decoding forward-link (FL) information in a wireless communication network includes the acts of decoding reverse-link (RL) information by a plurality of decoders, each being optimized based on a different parameter, and comparing a plurality of outputs from the decoders, based on a metric, to determine a decoder or parameter for reporting to an access terminal.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein is "exemplary" and is not necessarily to be construed as preferred or advantageous over other embodiments or designs.

The following disclosed embodiments provide methods and systems for access-point (AP) assisted Doppler/mobility-based filter selection for an access terminal (AT). The filter used for decoding RL information may be tuned based on the user's Doppler/mobility to improve performance. In one embodiment, for Doppler estimation, one may use multiple hypotheses decoding at the AP, where the same received data packet is decoded several times, each time using a filter tuned for a different Doppler frequency. The filter that successfully decodes one or a group of packets over a window of time represents the desired selection for the current Doppler. If multiple filters result in successful decodes, one of several methods may be used to select the desired filter, such as picking one filter randomly, picking the filter with median Doppler among the successful decodes, picking the filter with the best soft information such as the highest error correcting code log-likelihood ratio (LLR), or re-encoding the data and comparing the different outputs based on some metric to find the desired filter.

In one embodiment, multiple hypotheses decoding provides a method for filter selection; however, this method may be computationally too complex to be used by the access terminal (AT). On the other hand, the access-point (AP) may have the computational ability to perform the multiple decodes to select a Doppler-based filter. In one embodiment, the access point may determine s desired filter based on reverse link (RL) traffic, and report the filter, or identification thereof, to the access terminal. The access terminal may use the selected filter for decoding the forward link (FL) information.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

Figure 1A:
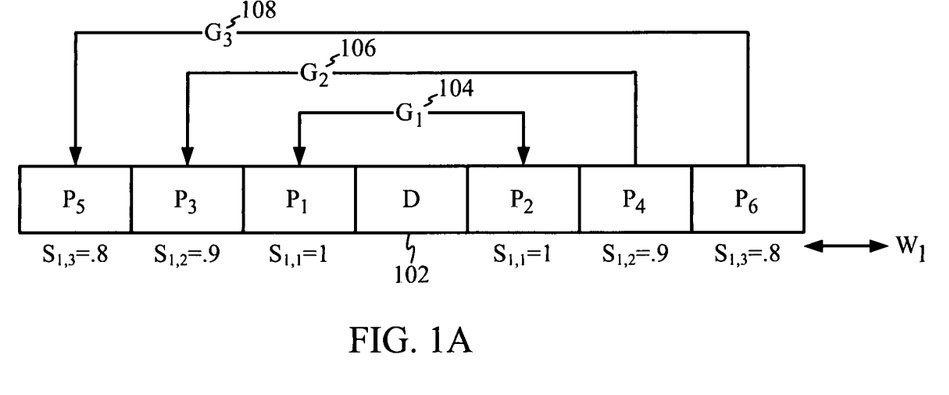
FIG. 1 shows one embodiment for scaling pilot symbols for estimating a data symbol.

FIG. 1 shows one embodiment for scaling pilot symbols for estimating the channel response for a data symbol. FIG. 1A represents one embodiment, where a data symbol 102 is surrounded by a number of pilot symbols. e.g., six pilot symbols. The pilot symbols may be generally placed in time, frequency, time-frequency, and/or code space from the data symbols. The pilot symbols may be generally known to the access point (AP) and/or access terminal (AT), and consequently their received values may be used for determining (estimating) the channel response for the transmitted data symbols. In one embodiment, a number of pilot symbols surrounding a data symbol are grouped according to their relationships to the data symbol, such as their relative time, frequency, time-frequency, code, and/or proximity. For example, pilot symbols $P_1$ and $P_2$ are grouped in a first group $G_1$, shown by 104, pilot symbols $P_3$ and $P_4$ are grouped in a second group $G_2$, shown by 106, and pilot symbols $P_5$ and $P_6$ are grouped in a third group $G_3$, shown by 108, in FIG. 1A.

In one embodiment, each group of pilot symbols is scaled based on their common relationship with the data symbol. A first scaling factor may be assigned to a first group of pilot symbols having a first relationship with the data symbol, and a second scaling factor may be assigned to a second group of pilot symbols having a second relationship with the data symbol, and so on. The choice of scaling factors may allow the first and the second groups of pilot symbols to be different when the first and the second relationships are different. In one embodiment, the first scaling factor has a larger magnitude than the second scaling factor when the first group has a closer relationship to the data symbol.

For example, as in FIG. 1A, a first scaling factor $S_{1,1}$ of 1.0 is assigned to the first group $G_1$ of pilot symbols, a second scaling factor $S_{1,2}$ of 0.9 is assigned to the second group $G_2$ of pilot symbols, and a third scaling factor $S_{1,3}$ of 0.8 is assigned to the third group $G_3$ of pilot symbols. The set of the scaling factors, $S_{1,1}$, $S_{1,2}$, and $S_{1,3}$, may be represented by $W_1 = \{S_{1,1}, S_{1,2}, S_{1,3}\}$ which may represent a low Doppler/mobility, e.g., a pedestrian user. Similarly, as in FIG. 1B, a first scaling factor $S_{2,1}$ of 1.0 is assigned to the first group $G_1$ of pilot symbols, a second scaling factor $S_{2,2}$ of 0.5 is assigned to the second group $G_2$ of pilot symbols, and a third scaling factor $S_{2,3}$ of 0.2 is assigned to the third group $G_3$ of pilot symbols. The set of the scaling factors, $S_{2,1}$, $S_{2,2}$, and $S_{2,3}$, may be represented by $W_2 = \{S_{2,1}, S_{2,2}, S_{2,3}\}$. The set of scaling factors $W_1$ and/or $W_2$ may include real, imaginary, or complex values.

In one embodiment, at least some of the scaling factors may be chosen based on Doppler information and/or mobility information about an access terminal. Thus; FIG. 1A may represent a scenario for a slow moving and/or low Doppler AT (e.g. a pedestrian), for which the groups of pilot symbols are scaled with slow-slope varying scaling factors, and FIG. 1B may represent a scenario for a fast moving and/or high Doppler AT (vehicular), for which the groups of pilot symbols are scaled with high-slope varying scaling factor.

In one embodiment, at least one of the scaling factors may be dynamically assigned, such that the assignment may change real-time based on some changing factors, e.g., Doppler, speed, direction of movement, etc. In one embodiment, at least one of the scaling factors may be statically assigned, such that the assignment may stay fixed.

Figure 2:
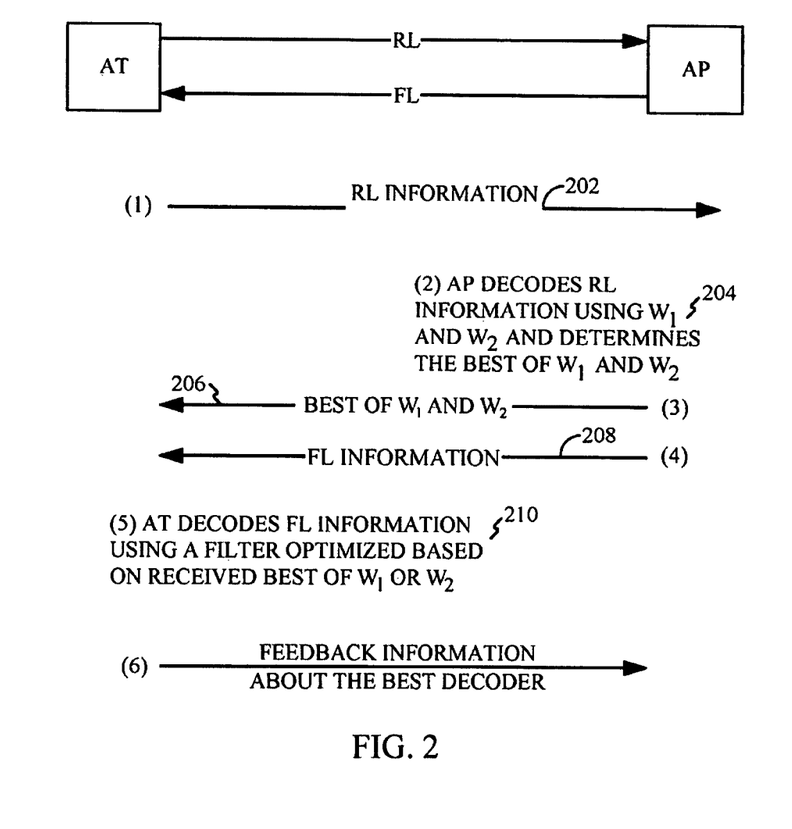
FIG. 2 shows one embodiment for decoding data symbols.

FIG. 2 shows one embodiment for decoding data symbols. In a first stage, a filter for decoding RL information in a wireless communication network is selected, e.g., based on the user's Doppler and/or mobility information. In the second stage, the AT uses the selected filter to decode FL information. The selection of the filter may be performed by the AP, by AT, or jointly.

In one embodiment, as shown by FIG. 2, the process of selecting the filter for decoding RL information includes receiving RL information from an AT, act 202, and decoding RL information by a plurality of decoders, act 204. The process continues, in act 204, with comparing the outputs of the decoders, based on a metric, to determine the decoder.

The plurality of decoders (filters) may have similar architecture, each optimized based on a different set of parameters. In one embodiment, the parameters provide Doppler information about an access terminal. In one embodiment, the parameters provide mobility information about an access terminal.

In one embodiment, the metric includes a rate of successfully decoded packets, e.g., over a window of time, and the desired decoder corresponds to the one generating the highest rate of successfully decoded packets. In one embodiment, the metric includes CRC checksum, and the desired decoder corresponds to the highest CRC checksum.

The process may continue in act 206 by forwarding information about the selected decoder to an access terminal for decoding FL information, received in act 208.

Figure 1B:
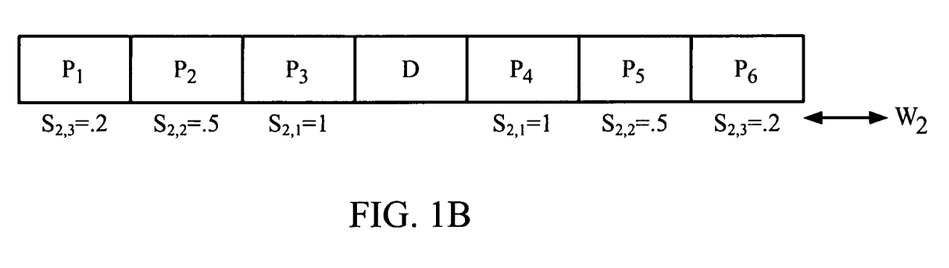
Figure 3:
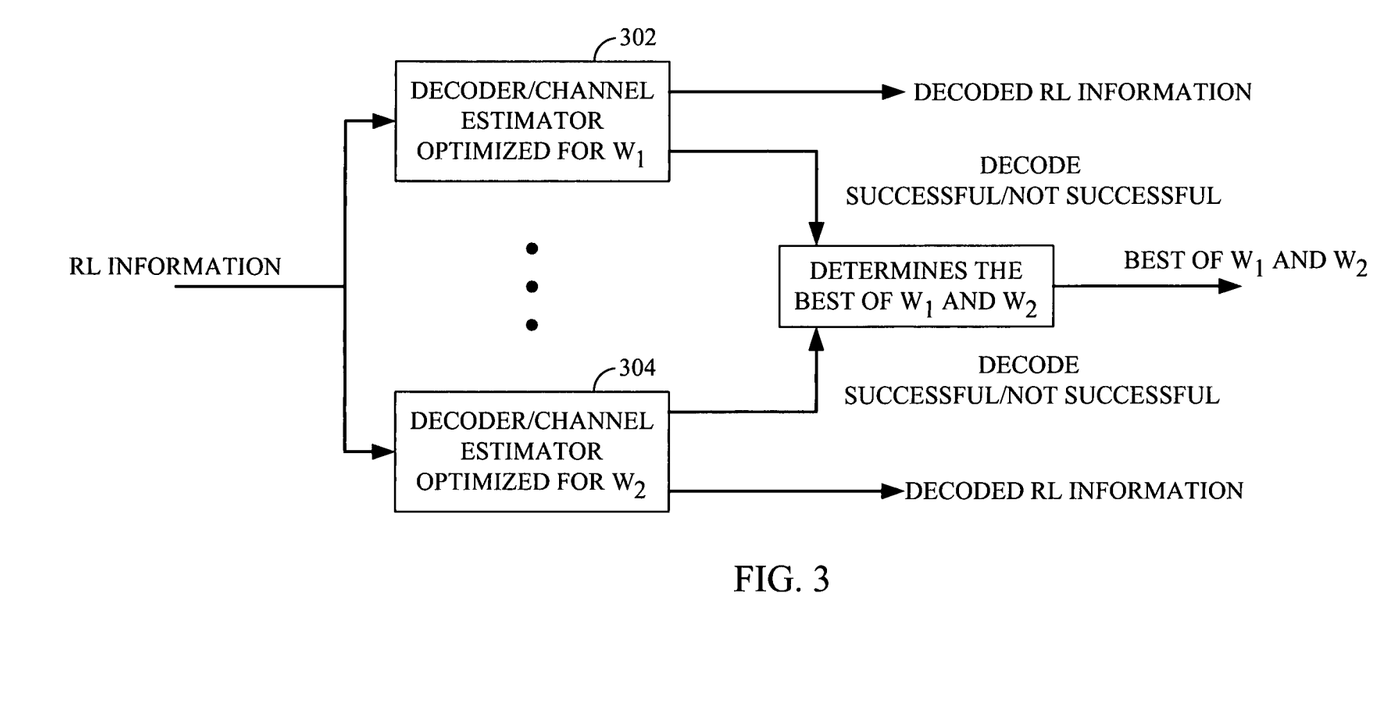
FIG. 3 shows one embodiment for selecting a decoder based on rate of change of Doppler and/or mobility of an access terminal.

FIG. 3 shows one embodiment for selecting a decoder, e.g., based on rate of change of Doppler and/or mobility of an access terminal. In one embodiment, two or more decoders 302 through 304 receive RL information from an AT and decode the received RL information. Each of the decoders 302 through 304 may be optimized with a unique set of parameters, which may correspond to at least one characteristic of the AT. In one embodiment, the filters are optimized for different levels of Doppler and/or mobility of a user e.g., filter 302 is optimized with a set of scaling factors $W_1 = \{S_{1,2}, S_{1,2}, S_{1,3}\}$, which may correspond to a low Doppler and/or mobility user, as shown in FIG. 1A, and filter 304 is optimized with a set of scaling factors $W_2 = \{S_{2,1}, S_{2,2}, S_{2,3}\}$, which may correspond to a high Doppler and/or mobility, as shown in FIG. 1B. In general, more filters optimized with parameters falling between $W_1$ and $W_2$ may be used. Alternatively, an AP may optimize a single filter, each time with a different set of parameters, to obtain multiple instances of the filter and generate multiple outputs for comparison, and select an instance of the filter for FL data decoding.

Depending on the characteristics of the RL information, e.g., whether it is related to a low or high Doppler and/or mobility user, one of the filters 302 through 304 may more successfully decode the received data packets. For example' when the highest rate of successfully decoded packets is 50% for a decoder 302, and the lowest rate of successfully decoded packets is 20% for a decoder 304, decoder 302 is determined to be the best decoder. Knowing that filter 302 had been optimized with a set of parameter $W_1$ that corresponds to a low Doppler/mobility user, its higher successful rating indicates that the user whose RL information was decoded is a low Doppler/mobility user, e.g., a pedestrian user.

Returning to FIG. 2, the AT decodes the FL information, in act 210, based on the received information for the best filter, i.e., information indicating whether the user is a low Doppler/mobility, e.g., a pedestrian, or a high Doppler/mobility, e.g., a vehicular user. In one embodiment, the AT selects one of a plurality of decoders based on the received information for the best filter. Alternatively, the AT optimizes a decoder based on the received information and/or parameters for the best filter, and the AT decodes the FL information using the optimized instance of the filter.

Figure 4:
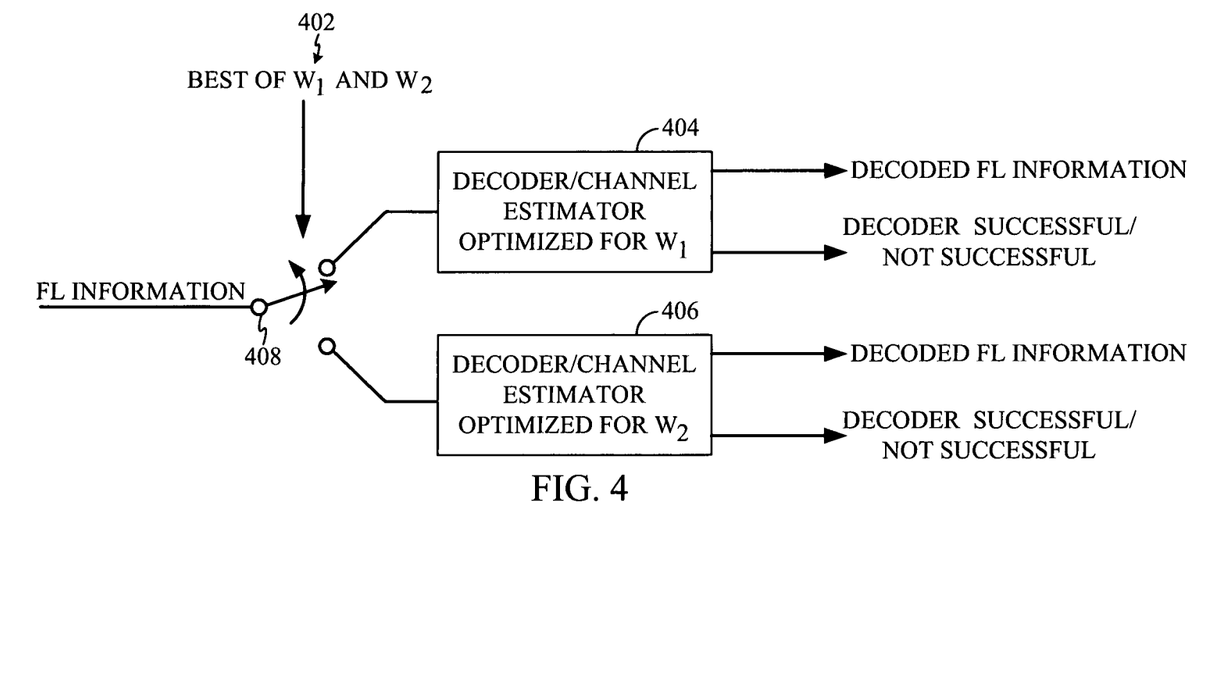
FIG. 4 shows one embodiment for decoding information.

For example, in FIG. 4, after AT receives information 402 identifying the desired filter, e.g., the set of parameters $\{W_1 = \{S_{1,1}, S_{1,2}, S_{1,3}\}, W_2 = \{S_{2,1}, S_{2,2}, S_{2,3}\}, \ldots \}$, or an indication that a specific set of parameters, e.g., $W_1$, defines the best filter, the AT selects, e.g., via switch 408, filter 404, which is also optimized with $W_1 = \{S_{1,1}, S_{1,2}, S_{1,3}\}$. Alternatively, after AT receives the set of parameters $W_1 = \{S_{1,1}, S_{1,2}, S_{1,3}\}$ defining the best filter, the AT optimizes a filter with $W_1 = \{S_{1,1}, S_{1,2}, S_{1,3}\}$ and decodes the received FL information using the optimized instance of the filter.

Returning to FIG. 2, the AT may send a feedback to the AP, indicating the rate of success of decoded FL packets, for improving on selection of the filter. Accordingly, the AP may use an improved set of scaling factors in future filter selection.

Figure 5:
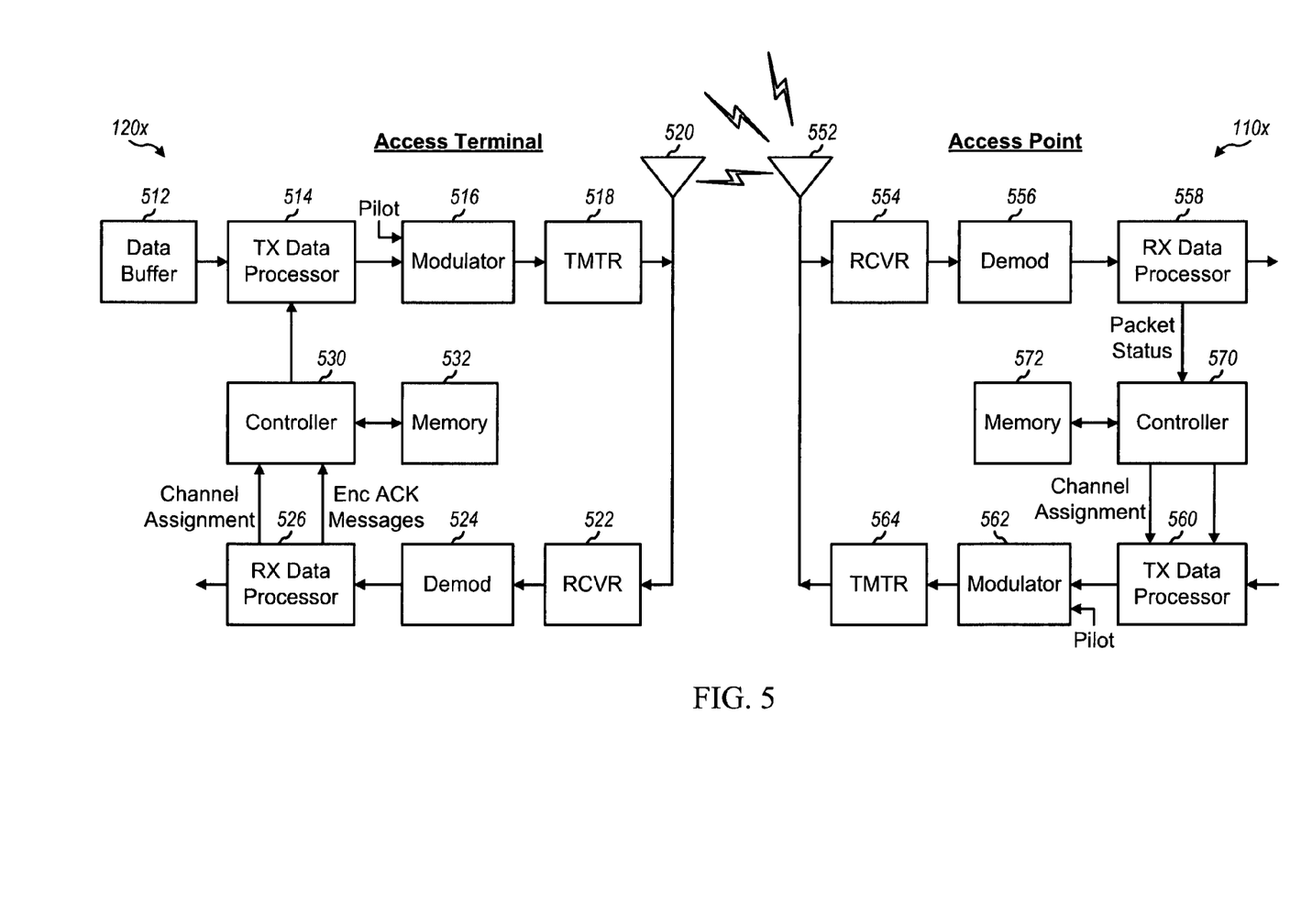
FIG. 5 shows a block diagram of an access point and an access terminal.

FIG. 5 shows a block diagram of an access point 110*x* and an access terminal 120*x*. For the reverse link, at access terminal 120*x*, a transmit (TX) data processor 514 receives traffic data from a data buffer 512, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 516 receives the data symbols, pilot symbols, and possibly signaling for the reverse link, performs (e.g., OFDM) modulation and/or other processing as specified by the system, and provides a stream of output chips. A transmitter unit (TMTR) 518 processes (e.g., converts to analog, filters, amplifies, and frequency upconverts) the output chip stream and generates a modulated signal, which is transmitted from an antenna 520.

At access point 110x, the modulated signals transmitted by access terminal 120x and other terminals in communication with access point 110x are received by an antenna 552. A receiver unit (RCVR) 554 processes (e.g., conditions and digitizes) the received signal from antenna 552 and provides received samples. A demodulator (Demod) 556 processes (e.g., demodulates and detects) the received samples and provides detected data symbols, which are noisy estimate of the data symbols transmitted by the terminals to AP 110x. A receive (RX) data processor 558 processes (e.g., symbol demaps, deinterleaves, and decodes) the detected data symbols for each terminal and provides decoded data for that terminal.

For the forward link, at AP 110x, traffic data is processed by a TX data processor 560 to generate data symbols. A modulator 562 receives the data symbols, pilot symbols, and signaling for the forward link, performs (e.g., OFDM) modulation and/or other pertinent processing, and provides an output chip stream, which is further conditioned by a transmitter unit 564 and transmitted from antenna 552. The forward link signaling may include power control commands generated by a controller 570 for all terminals transmitting on the reverse link to AP 110x. At AT 120x, the modulated signal transmitted by AP 110x is received by antenna 520, conditioned and digitized by a receiver unit 522, and processed by a demodulator 524 to obtain detected data symbols. An RX data processor 526 processes the detected data symbols and provides decoded data for the terminal and the forward link signaling. Controller 530 receives the power control commands, and controls data transmission and transmit power on the reverse link to AP 110x. Controllers 530 and 570 direct the operation of AT 120x and AP 110x, respectively such as determining the best filter, reporting information about the best filter, and decoding information using a desired filter, as discussed above in connection with FIG. 1 through FIG. 4. Memory units 532 and 572 store program codes and data used by controllers 530 and 570, respectively.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 532 or 572 in FIG. 5) and executed by a processor (e.g., controller 530 or 570). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for selecting a filter for decoding forward link (FL) information in a wireless communication network, the method comprising:

decoding reverse link (RL) information, received from an access terminal, by a plurality of decoders, each being optimized based on a different set of parameters;

comparing a plurality of outputs from the decoders, based on a metric, thereby determining a desired decoder to decode forward link (FL) information; and forwarding information about the desired decoder to the access terminal for decoding FL information.

2. The method of claim 1, wherein decoding the RL information further comprises decoding the RL information by a plurality decoders, the plurality of decoders having similar architecture.

3. The method of claim 1, wherein decoding the RL information further comprises optimizing the plurality of decoders based on different sets of parameters providing Doppler information about an access terminal.

4. The method of claim 1, wherein decoding the RL information further comprises optimizing the plurality of decoders based on different sets of parameters providing mobility information about an access terminal.

5. The method of claim 1, wherein comparing the plurality of outputs from the decoders further comprises comparing the plurality of outputs from the decoders based on a metric, comprising a rate of successfully decoded packets, and thereby determining a desired decoder to decode forward link (FL) information corresponding to the highest rate of successfully decoded packets.

6. The method of claim 1, wherein comparing the plurality of outputs from the decoders further comprises comparing the plurality of outputs from the decoders based on a metric, comprising a cyclic redundancy check (CRC) checksum, and thereby determining a desired decoder to decode forward link (FL) information corresponding to a highest CRC checksum.

7. The method of claim 1, further comprising forwarding information about the desired decoder to an access terminal for decoding FL information.

8. A method for decoding forward link (FL) information in a wireless communication network, the method comprising:

receiving, from an access point, information identifying a desired decoder; and decoding FL information using the desired decoder.

9. The method of claim 8, wherein receiving information further comprises receiving a set of parameters for optimizing the desired decoder.

10. The method of claim 9, wherein receiving the set of parameters further comprises receiving the set of parameters providing Doppler information for an access terminal.

11. The method of claim 9, wherein receiving the set of parameters further comprises receiving the set of parameters providing mobility information for an access terminal.

12. The method of claim 8, further comprising providing feedback information about the desired decoder to the access point for improving filter selection.

13. The method of claim 8, wherein receiving the information identifying the desired decoder further comprises receiving a set of parameters determined at the access point.

14. An apparatus for selecting a filter for decoding forward link (FL) information in a wireless communication network, comprising:
means for decoding reverse link (RL) information, received from an access terminal, by a plurality of decoders, each being optimized based on a different set of parameters;
means for comparing a plurality of outputs from the decoders, based on a metric, thereby determining a desired decoder to decode forward link (FL) information; and
means for forwarding information about the desired decoder to the access terminal for decoding FL information.

15. The apparatus of claim 14, wherein the decoders have similar architecture.

16. The apparatus of claim 14, wherein the set of parameters further comprises parameters providing Doppler information about an access terminal.

17. The apparatus of claim 14, wherein the set of parameters further comprises parameters providing mobility information about an access terminal.

18. The apparatus of claim 14, wherein the metric comprises a rate of successfully decoded packets, and the desired decoder corresponds to the highest rate of successfully decoded packets.

19. The apparatus of claim 14, wherein the metric further comprises a cyclic redundancy check (CRC) checksum, and the desired decoder corresponds to a highest CRC checksum.

20. The apparatus of claim 14, further comprising means for forwarding information about the desired decoder to an access terminal for decoding FL information.

21. An apparatus for decoding forward link (FL) information in a wireless communication network, comprising:
means for receiving, from an access point, information identifying a desired decoder; and
means for decoding FL information using the desired decoder.

22. The apparatus of claim 21, wherein the means for receiving information further comprises means for receiving a set of parameters for optimizing the desired decoder.

23. The apparatus of claim 22, wherein the set of parameters further comprises parameters providing Doppler information for an access terminal.

24. The apparatus of claim 22, wherein the set of parameters further comprises parameters providing mobility information for an access terminal.

25. The apparatus of claim 21, further comprising means for providing feedback information about the desired decoder to the access point for improving filter selection.

26. The apparatus of claim 21, wherein the information identifying the desired decoder further comprises a set of parameters determined at the access point.

27. A non-transitory computer-readable medium having computer-executable instructions embodying means for implementing a method for selecting a filter for decoding forward link (FL) information in a wireless communication network, the method comprising:
decoding reverse link (RL) information, received from an access terminal, by a plurality of decoders, each being optimized based on a different set of parameters;
comparing a plurality of outputs from the decoders, based on a metric, thereby determining a desired decoder to decode forward link (FL) information; and
forwarding information about the desired decoder to the access terminal for decoding FL information.

28. The computer-readable medium of claim 27, wherein decoding the RL information further comprises decoding the RL information by a plurality of decoders having similar architecture.

29. The computer-readable medium of claim 27, wherein decoding the RL information comprises decoding the RL information by a by a plurality of decoders, each being optimized based on a different set of parameters providing Doppler information about an access terminal.

30. The computer-readable medium of claim 27, wherein decoding the RL information comprises decoding the RL information by a by a plurality of decoders, each being optimized based on a different set of parameters providing mobility information about an access terminal.

31. The computer-readable medium of claim 27, wherein comparing the plurality of outputs from the decoders further comprises comparing the plurality of outputs from the decoders based on a metric further comprising a rate of successfully decoded packets, and thereby determining the desired decoder corresponding to the highest rate of successfully decoded packets.

32. The computer-readable medium of claim 27, wherein comparing the plurality of outputs from the decoders further comprises comparing the plurality of outputs from the decoders based on a metric further comprising a cyclic redundancy check (CRC) checksum, and thereby determining the desired decoder corresponding to a highest CRC checksum.

33. The computer-readable medium of claim 27, further comprising forwarding information about the desired decoder to an access terminal for decoding FL information.

34. A non-transitory computer-readable medium having computer-executable instructions embodying means for implementing a method for decoding forward link (FL) information in a wireless communication network, the method comprising:
receiving, from an access point, information identifying a desired decoder; and
decoding FL information using the desired decoder.

35. The computer-readable medium of claim 34, wherein receiving information further comprises receiving a set of parameters for optimizing the desired decoder.

36. The computer-readable medium of claim 35, wherein the set of parameters further comprises parameters providing Doppler information for an access terminal.

37. The computer-readable medium of claim 35, wherein the set of parameters further comprises parameters providing mobility information for an access terminal.

38. The computer-readable medium of claim 34, further comprising providing feedback information about the desired decoder to the access point for improving filter selection.

39. The computer-readable medium of claim 34, wherein the information identifying the desired decoder further comprises a set of parameters determined at the access point.

40. An access point for selecting a filter for decoding forward link (FL) information by an access terminal in a wireless communication network, comprising:
- a plurality of decoders each being optimized based on different set of parameters for decoding reverse link (RL) information from the access terminal;
- a processor configured to determine a desired decoder to decode forward link (FL) information based on a comparison of a plurality of outputs from the decoders based on a metric; and
- a transmitter configured to transmit information about the desired decoder to the access terminal.

41. An access terminal for decoding forward link (FL) information in a wireless communication network, comprising:
- a receiver configured to receive, from an access point, information identifying a desired decoder;
- a plurality of decoders each being optimized based on different set of parameters; and
- a processor configured to select a desired decoder for decoding FL information based on the received information identifying the desired decoder.

42. An access point for selecting a filter for decoding forward link (FL) information by an access terminal in a wireless communication network, comprising:
- a decoder configured to decode reverse link (RL) information, received from an access terminal, based on different sets of parameters;
- a processor configured to determine a desired set of parameters identifying a decoder to decode forward link (FL) information based on comparing outputs from the decoder corresponding to the different sets of parameters based on a metric; and
- a transmitter configured to transmit the desired set of parameters to the access terminal.

43. An access terminal for decoding forward link (FL) information in a wireless communication network, comprising:
- a receiver configured to receive, from an access point, a desired set of parameters identifying a desired decoder; and
- a decoder capable of being optimized based on the received desired set of parameters and decoding FL information.

44. At least one processor programmed to implement a method for selecting a filter for decoding forward link (FL) information in a wireless communication network, the method comprising:
- decoding reverse link (RL) information, received from an access terminal based on different set of parameters;
- comparing a plurality of outputs from said decoding, based on a metric, thereby determining a desired decoder to decode forward link (FL) information; and
- forwarding information about the desired decoder to the access terminal for decoding FL information.

45. At least one processor programmed to implement a method for decoding forward link (FL) information in a wireless communication network, the method comprising:
- receiving, from an access point, information identifying a desired decoder; and
- decoding FL information using the received information.

* * * * *